(12) United States Patent
Mueggenborg et al.

(10) Patent No.: US 11,585,827 B2
(45) Date of Patent: Feb. 21, 2023

(54) TILT SENSOR FOR AN ANTENNA

(71) Applicant: ZEBRA TECHNOLOGIES CORPORATION, Lincolnshire, IL (US)

(72) Inventors: Alexander Mueggenborg, Arlington, VA (US); Daniella Strat, Sound Beach, NY (US); Chad Chaumont, Mount Sinai, NY (US); Edward A. Richley, Gaithersburg, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 237 days.

(21) Appl. No.: 16/874,880

(22) Filed: May 15, 2020

(65) Prior Publication Data
US 2021/0356493 A1 Nov. 18, 2021

(51) Int. Cl.
| | |
|---|---|
| G08B 21/18 | (2006.01) |
| G01P 13/00 | (2006.01) |
| G06K 7/10 | (2006.01) |
| G01P 15/18 | (2013.01) |

(52) U.S. Cl.
CPC ............ G01P 13/00 (2013.01); G01P 15/18 (2013.01); G06K 7/10297 (2013.01); G08B 21/182 (2013.01)

(58) Field of Classification Search
CPC ..... G01P 13/00; G01P 15/18; G06K 7/10297; G08B 21/182
See application file for complete search history.

(56) References Cited

U.S. PATENT DOCUMENTS

| 2004/0145454 A1 | 7/2004 | Powell et al. |
| 2009/0021374 A1 | 1/2009 | Stagg |
| 2010/0217533 A1* | 8/2010 | Nadkarni ............... G16Z 99/00 |
| | | 702/179 |

(Continued)

FOREIGN PATENT DOCUMENTS

WO 20170117224 A1 7/2017

OTHER PUBLICATIONS

International Search Report and Written Opinion for International Application No. PCT/US2021/031303 dated Aug. 11, 2021.

(Continued)

*Primary Examiner* — Hongmin Fan

(57) ABSTRACT

Methods and devices for determining movement associated with an antenna of a receiver are disclosed herein. An example method includes generating a first acceleration signal associated with the antenna, wherein the first acceleration signal includes one or more substantially non-zero axial components. The method may further include establishing an acceleration signature corresponding to the antenna based on the first acceleration signal, and generating a second acceleration signal associated with the antenna, wherein the second acceleration signal includes one or more substantially non-zero axial components. The method may further include determining a signal difference between the acceleration signature and the second acceleration signal, wherein the signal difference is attributable to a movement of the antenna. The method may further include generating an alert signal indicating the movement.

17 Claims, 13 Drawing Sheets

(56) References Cited

U.S. PATENT DOCUMENTS

2015/0357708 A1* 12/2015 Au .................. H01Q 1/246
                                                        343/766
2016/0188931 A1  6/2016 Jones et al.
2016/0349352 A1 12/2016 Karani et al.

OTHER PUBLICATIONS

Novelty Search Report for Belgian Application No. 2021/5386 dated Jan. 26, 2022.

* cited by examiner

TILT SENSOR FOR AN ANTENNA

BACKGROUND

Warehouses, retail spaces, hospitals, daycares, laboratories or other venues often employ Radio Frequency Identification (RFID) technology to track various objects located therein. For example, products, packages, vehicles, people, scanners, and robots may all be tagged with an RFID tag. An RFID positioning system located in the venue may then track the location of tagged objects as the objects traverse the venue. RFID sensing stations are positioned throughout a venue, such as in overhead locations, on walls, or other surfaces, and operated to identify RFID tags on targets moving throughout the venue. The RFID sensing stations are connected to a network host computer or server. The specific location of any particular RFID-tagged product in the venue is typically determined by having the host computer process the payloads and capture data from a plurality of the RFID sensing stations and using triangulation/trilateration techniques.

Conventionally, RFID sensing stations are oriented in a fashion suitable to receive signals from the RFID tags. The orientation of each RFID sensing station is critical to ensure an accurate position determination and data capture for each tagged object. While adequate orientation of the RFID sensing station is typically accomplished at installation, various actions or environmental conditions within a venue may result in the RFID antenna being repositioned. For example, vibrations within a venue due to heavy machinery or environmental conditions (e.g., thunderstorms, hail, earthquakes, etc.), HVAC systems, or any direct physical contact with the RFID sensing station may be sufficient to reposition the antenna. Consequently, there is a need for techniques to determine when an RFID sensing station antenna has been repositioned.

SUMMARY

In an embodiment, the present invention is a method for determining movement associated with an antenna of a receiver. The method comprises generating, via a tilt sensor included in the antenna, a first acceleration signal associated with the antenna, wherein the first acceleration signal includes one or more axial components, and at least one of the one or more axial components is substantially non-zero. The method further includes establishing, by a processor included in the receiver, an acceleration signature corresponding to the antenna based on the first acceleration signal. The method further includes generating, via the tilt sensor, a second acceleration signal associated with the antenna, wherein the second acceleration signal includes one or more axial components, and at least one of the one or more axial components are substantially non-zero. The method further includes determining, by the processor, a signal difference between the acceleration signature and the second acceleration signal, wherein the signal difference is attributable to a movement of the antenna. The method further includes generating an alert signal indicating the movement.

In a variation of this embodiment, the acceleration signature includes one or more threshold axial components. Further in this variation, the method further comprises comparing, by the processor, each axial component of the second acceleration signal to a corresponding threshold axial component of the acceleration signature. In this variation, the method may further include, responsive to determining at least one axial component of the second acceleration signal exceeds the corresponding threshold axial component of the acceleration signature, determining, by the processor, the signal difference between the acceleration signature and the second acceleration signal. Further in this variation, the total magnitude of the acceleration signature is equivalent to the total magnitude of the second acceleration signal.

In another variation of this embodiment, the method further comprises analyzing, by the processor, the one or more axial components of the second acceleration signal to determine an adjustment instruction corresponding to the antenna. Further in this variation, the alert signal includes the adjustment instruction.

In yet another variation of this embodiment, the receiver is one of a plurality of receivers, and each receiver includes a respective antenna. Further in this variation, the method further comprises receiving, at each of the plurality of receivers, an RFID tag signal corresponding to an object. The method further comprises determining, by one or more processors, a location associated with the object based on the RFID tag signal. The method further comprises establishing, by the processor included in the receiver, the acceleration signature corresponding to the antenna based on the first acceleration signal and the location associated with the object.

In another variation of this embodiment, the method further comprises receiving, at the receiver, a distorted RFID tag signal, and attempting, by the processor, to interpret the distorted RFID tag signal. The method further comprises, responsive to being unable to interpret the distorted RFID tag signal, determining, by the processor, the signal difference between the acceleration signature and the second acceleration signal.

In still another variation of this embodiment, at least one of the processor or the tilt sensor generates the alert signal indicating the movement, the tilt sensor includes an accelerometer, the second acceleration signal includes a timestamp, and the alert signal includes the timestamp. In another variation of this embodiment, a housing of the receiver is mounted in a fixed position via unmovable hardware.

In another variation of this embodiment, generating the alert signal further comprises at least one of (i) adjusting the acceleration signature to correspond to the second acceleration signal or (ii) compensating, via the antenna, a power level associated with subsequent generated acceleration signals.

In another embodiment, the present invention is a system for determining movement associated with an antenna of a receiver. The system comprises a tilt sensor included in the antenna and configured to generate a first acceleration signal associated with the antenna. The first acceleration signal includes one or more axial components, and at least one of the one or more axial components is substantially non-zero. The tilt sensor is further configured to generate a second acceleration signal associated with the antenna. The second acceleration signal includes one or more axial components, and at least one of the one or more axial components are substantially non-zero. The system further comprises one or more processors included in the receiver, and a non-transitory computer-readable memory coupled to the tilt sensor and the one or more processors. The memory stores instructions thereon that, when executed by the one or more processors, cause the one or more processors to establish an acceleration signature corresponding to the antenna based on the first acceleration signal. The instructions, when executed by the one or more processors, further cause the one or more processors to determine a signal difference between the acceleration signature and the second acceleration signal, wherein the signal difference is attributable to a movement of the antenna; and generate an alert signal indicating the movement.

In a variation of this embodiment, the acceleration signature includes one or more threshold axial components, and the instructions, when executed by the one or more processors, further cause the one or more processors to: compare each axial component of the second acceleration signal to a corresponding threshold axial component of the acceleration signature; and responsive to determining at least one axial component of the second acceleration signal exceeds the corresponding threshold axial component of the acceleration signature, determine the signal difference between the acceleration signature and the second acceleration signal.

In another variation of this embodiment, the instructions, when executed by the one or more processors, further cause the one or more processors to: analyze the one or more axial components of the second acceleration signal to determine an adjustment instruction corresponding to the antenna; and wherein the alert signal includes the adjustment instruction.

In yet another variation of this embodiment, the receiver is one of a plurality of receivers, each receiver includes a respective antenna, each receiver receives an RFID tag signal corresponding to an object, and the instructions, when executed by the one or more processors, further cause the one or more processors to: determine a location associated with the object based on the RFID tag signal; and establish the acceleration signature corresponding to the antenna based on the first acceleration signal and the location associated with the object.

In still another variation of this embodiment, the receiver receives a distorted RFID tag signal, and the instructions, when executed by the one or more processors, further cause the one or more processors to: attempt to interpret the distorted RFID tag signal; and responsive to being unable to interpret the distorted RFID tag signal, determine the signal difference between the acceleration signature and the second acceleration signal.

In another variation of this embodiment, a housing of the receiver is mounted in a fixed position via unmovable hardware, at least one of the processor or the tilt sensor generates the alert signal indicating the movement, the tilt sensor included in the antenna includes an accelerometer, the second acceleration signal includes a timestamp, and the alert signal includes the timestamp.

In yet another variation of this embodiment, the instructions, when executed by the one or more processors, further cause the one or more processors to generate the alert signal by at least one of (i) adjusting the acceleration signature to correspond to the second acceleration signal or (ii) compensating, via the antenna, a power level associated with subsequent generated acceleration signals.

In another embodiment, the present invention is a tangible machine-readable medium comprising instructions for determining movement associated with an antenna of a receiver that, when executed, cause a machine to at least generate a first acceleration signal associated with the antenna. The first acceleration signal includes one or more axial components, and at least one of the one or more axial components is substantially non-zero. The instructions, when executed, cause a machine to further at least establish an acceleration signature corresponding to the antenna based on the first acceleration signal; generate a second acceleration signal associated with the antenna, wherein the second acceleration signal includes one or more axial components, and at least one of the one or more axial components are substantially non-zero; determine a signal difference between the acceleration signature and the second acceleration signal, wherein the signal difference is attributable to a movement of the antenna; and generate an alert signal indicating the movement.

In a variation of this embodiment, the acceleration signature includes one or more threshold axial components, and the instructions, when executed, further cause the machine to at least: compare each axial component of the second acceleration signal to a corresponding threshold axial component of the acceleration signature; and responsive to determining at least one axial component of the second acceleration signal exceeds the corresponding threshold axial component of the acceleration signature, determine the movement associated with the antenna.

In yet another variation of this embodiment, the instructions, when executed, further cause the machine to at least: analyze the one or more axial components of the second acceleration signal to determine an adjustment instruction corresponding to the antenna; at least one of (i) adjust the acceleration signature to correspond to the second acceleration signal or (ii) compensate, via the antenna, a power level associated with subsequent generated acceleration signals; and wherein the alert signal includes the adjustment instruction.

In still another variation of this embodiment, the receiver is one of a plurality of receivers, each receiver includes a respective antenna, each receiver receives an RFID tag signal corresponding to an object, and the instructions, when executed, further cause the machine to at least: determine a location associated with the object based on the RFID tag signal; and establish the acceleration signature corresponding to the antenna based on the first acceleration signal and the location associated with the object.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
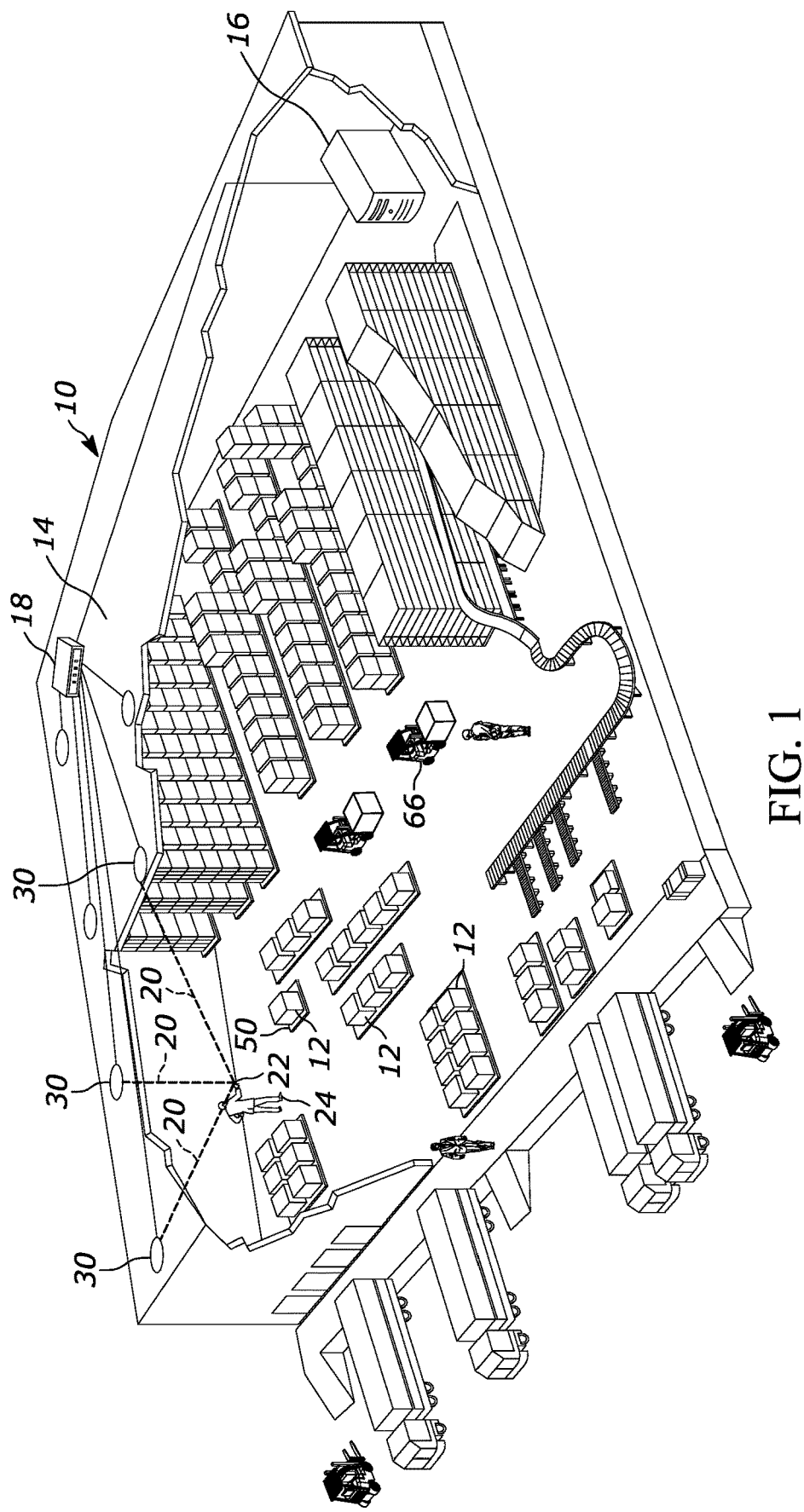
FIG. 1 illustrates an example venue in the form of a warehouse in which movable products may be located and tracked using RFID sensing stations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

RFID systems may be implemented using a plurality of overhead target sensing stations, each station having one or more transceiver-based sensing units that identify targets in the venue. For example, these sensing units may be RFID transceiver units that identify targets by identifying transmitters, such as RFID tags, associated with the targets. Therefore, it is important that each RFID transceiver unit be as accurate as possible in determining the bearings of an RFID in a venue for accurate representation of a location or movement of a desired target or object.

In order to optimize the accuracy of each individual RFID receiver, a tilt sensor (e.g., accelerometer) may be incorporated into the antenna to track the direction of the antenna's acceleration. Typically, RFID systems are installed in the ceiling or overhead areas of venues. As a result, receiver antennas are normally oriented in a downward-facing direction to optimally receive RFID tag signals from the floor areas below. The acceleration associated with such an orientation includes a substantially non-zero component in the downward-facing direction (e.g., one of x, y, or z), and minimal components in the directions planar with the ceiling (e.g., remaining two of x, y, or z). Following installation, the acceleration may be recorded and stored as an acceleration signature representing the optimal orientation of the antenna. Thus, if an antenna is repositioned, the repositioned acceleration may be compared with the acceleration signature to determine the new position of the antenna, instructions to reposition the antenna back into the optimal alignment, and other alerts, as described herein.

Referring now to the figures, FIG. 1 depicts an example venue 10 in the form of a warehouse in which movable products 12, shown in FIG. 1 as cuboid cartons for simplicity, may be located and tracked in accordance with the techniques described herein. The venue 10 may be any indoor or outdoor venue, and may have any layout or configuration. Although the example venue 10 is illustrated as a warehouse, the disclosed embodiments may be implemented at other types of venues (such as a retail store, an airport, a stadium, a performance center, a school, a hospital, etc.). Each movable product 12 is tagged with a mobile target, such as a passive or active RFID product tag. The RFID product tag may be associated with a single product representative of one warehoused item or multiple warehoused items. In some examples, the RFID product tag is associated with a pallet 50, or a container, for supporting multiple products 12.

A multitude of target sensing units or stations 30 are deployed in the venue 10. Each station 30 may be stationary and mounted at desired overhead positions, for example, on, or adjacent to, a ceiling 14. Merely by way of example, the target sensing stations 30 can be installed every twenty to eighty feet apart in a grid pattern. The number of target sensing stations 30 and the spacing of the target sensing stations 30 may depend on the size of the venue, e.g., thirty, sixty, ninety, or more stations in a venue spaced at a desired distance apart.

A network computer or host server may be a controller 16, typically locally located in a backroom at the venue 10. The controller 16 comprises one or more computers and is in wired, wireless, direct, or networked communication with each target sensing station 30, for example, through a network switch 18. The controller 16 may also be remotely hosted in a cloud server. The controller 16 may include a wireless RF transceiver that communicates with each station 30. For example, Wireless Fidelity (Wi-Fi) and Bluetooth® are open wireless standards for exchanging data between electronic devices that may be employed to allow the controller 16 to communicate with each station 30. The server or controller 16 controls each station 30. In other examples, any of the functions of the controller 16 described herein may be implemented at any one or more of the stations 30.

The computer systems and stations described herein may be connected via a communication network, which can include local and wide-area wireless networks, wired networks, or other IEEE 802.11 or Wi-Fi™ wireless communication systems, including virtual and extended virtual networks. It is envisioned that the communication network includes a controller and various target sensing stations that provide the operations described herein. It should be recognized that the present techniques could also be applied to any suitable wireless communication system. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

FIG. 1 illustrates how knowing the accurate position of a specific movable product 12 in the venue 10 is important for any shipping or storage industry. During the course of a typical day inside a warehouse or other storage facility (e.g., venue 10), many movable products 12 may be added, removed, and/or otherwise relocated within or outside of the storage facility. If any moveable products 12 are lost or erroneously stored or placed on a transport vehicle (e.g., trailer truck), this can delay shipments containing a multitude of moveable products 12. As a result, misplacing a moveable product 12 can increase shipping times and costs and decrease worker productivity as venue 10 workers search to locate the misplaced moveable product 12.

The methods and systems described herein may allow for more accurate tracking of movable products based in part on the accurate positioning of the antenna associated with each station 30. For example, as a moveable product 12 is transported by a forklift 66 or worker 24 from one location to another, the sensing stations 30 may constantly transmit signals to the moveable product 12 in order to determine the location of the moveable product 12. The sensing stations 30 may transmit this location data to the controller 16 which may interpret the location data and determine a location of the moveable product 12 with respect to the venue 10. The controller 16 may then additionally transmit the location of the moveable product 12 to a workstation or handheld device 22 of a venue 10 employee (e.g., worker 24). Alternatively, and as illustrated in FIG. 1, a worker's 24 handheld device 22 may independently communicate with the sensing stations 30 via, for example, a tracking application or other networking interface configured to communicate with the sensing stations 30 to receive location data associated with moveable products 12 across communication channels 20. The communication channels 20 may be RF signals or any other suitable communication protocol.

However, in the above example, if the antenna associated with each sensing station 30 is not properly oriented, the location data received by these sensing stations 30 may be skewed or otherwise incorrect. Skewed location data may cause worker confusion and lost productivity as they are unable to locate the moveable product 12. Moreover, the skewed location data may indicate that a properly placed moveable product 12 is incorrectly placed, leading to further complications storing the moveable products 12 in venues 10 with limited space. The present techniques seek to solve and thereby avoid the complications associated with antenna disorientation by, in part, determining an acceleration signature for the antenna that corresponds to an optimal antenna orientation. Based on the acceleration signature, the antenna may be constantly monitored to determine if the antenna ever rotates, pivots, and/or otherwise moves out of its optimal orientation. Accordingly, the present techniques may decrease shipping times, decrease shipping costs, increase worker productivity, and increase product security and theft management capabilities.

Figure 2:
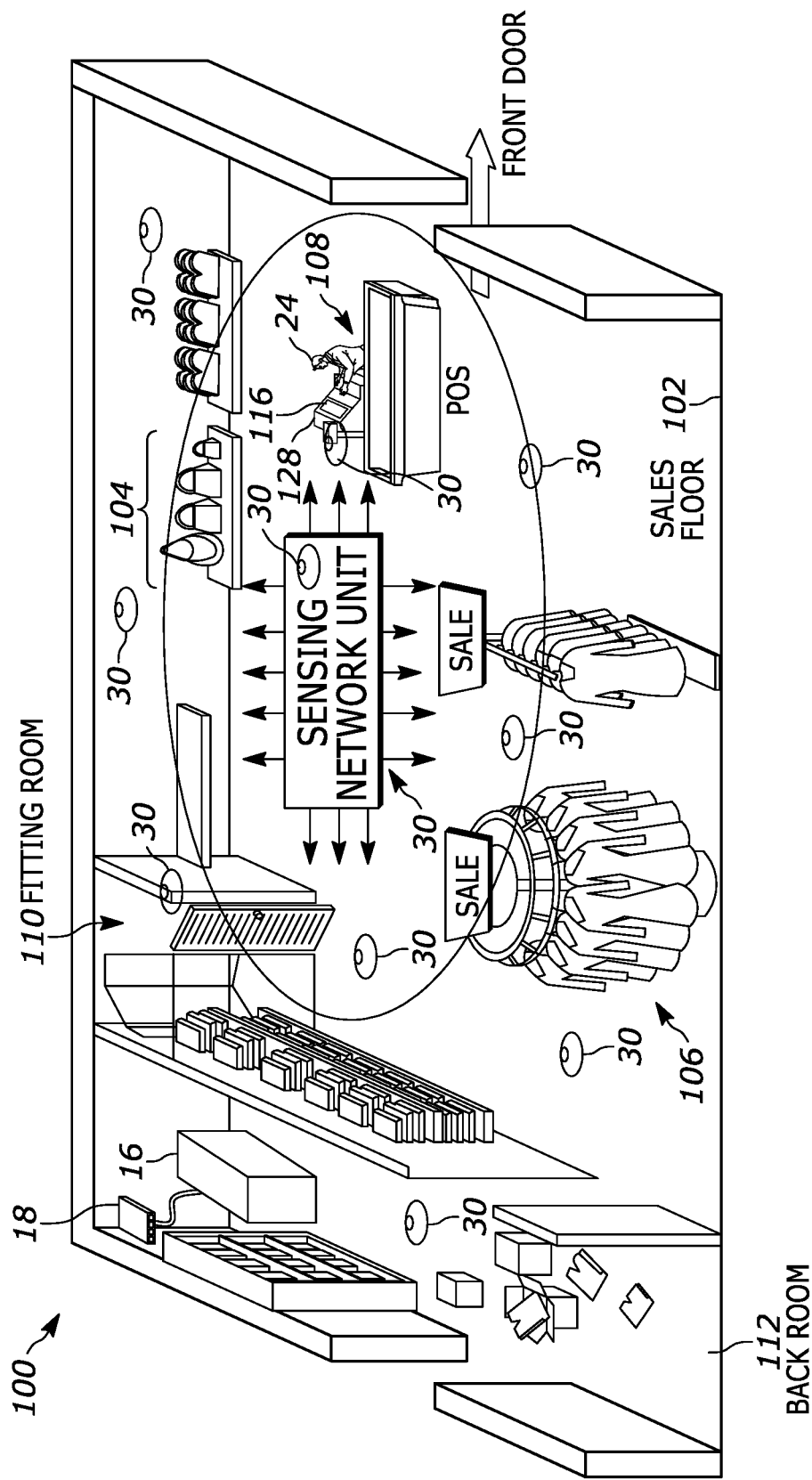
FIG. 2 illustrates an example venue in the form of a retail location having a retail sales floor on which a point-of-sale (POS) station is provided having a computer system and an interface.

FIG. 2 illustrates another example venue 100 in the form of a retail location having a retail sales floor 102 on which a point-of-sale (POS) station 108 is provided having a computer system 116 and an interface 128 having, for example, an optical scanner, touchpad, keypad, display, and data input/output interface connecting to the computer system 116. The computer system 116 is operated by an employee 24. The venue 100 further includes the network host computer or controller 16 connected to the plurality of target sensing stations 30 positioned throughout the venue 100, e.g., via the network switch 18. As further described herein, the target sensing stations 30 are able to locate and track targets including, for example, people, such as the employee 24, as well as the various retail products being offered for sale on the floor 102, e.g., clothes 106, handbags 104, etc., that are arranged on shelves, hangers, racks, etc. Each such product may be tagged with a radio frequency (RF) identification (RFID) tag for location and tracking as described.

The computer system 116 may comprise one or more computers and is in wired, wireless, direct, or networked communication with the interface 128 and with each target sensing station 30, e.g., via the network switch 18. The interface 128 provides a human/machine interface, e.g., a graphical user interface (GUI), that presents information in pictorial and/or textual form (e.g., representations of locations of the RFID-tagged products 104, 106) to the employee 24, and to initiate and/or alter the execution of various processes that may be performed by the computer system 116. The computer system 116 and the interface 128 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the interface 128 may be in a smartphone, or tablet, etc., while the computer system 116 may be a local computer, or a remotely hosted in a cloud computer. The computer system 116 may include a wireless RF transceiver that communicates with each target sensing station 30. For example, Wi-Fi and Bluetooth are open wireless standards for exchanging data between electronic devices.

The methods and systems disclosed herein provide a means for more consistent and accurate position tracking of the items illustrated in the retail venue 100 illustrated in FIG. 2. The systems and methods described may enable more resilient and higher spatial accuracy tracking of a clothing item 106 for inventory purposes or for theft prevention. For example, an antenna of one or more target sensing stations 30 may be repositioned out of the optimal orientation, such that the RF signals received by the one or more target sensing stations 30 may be skewed. Using the techniques of the present disclosure, the target sensing stations 30 may allow for tracking of an item as the item is moved towards the POS station 108 regardless of the antennas being repositioned. Namely, the controller 16 may be in communication with POS station 108 to receive a communication of the purchasing of the clothing item 106. The target sensing station 30 may receive skewed location information corresponding to the clothing item 106 and automatically adjust the skewed location information based on an acceleration signature corresponding to the optimal orientation of the antenna. Moreover, the target sensing station 30 may automatically generate an adjustment instruction to communicate to the controller 16 or directly to the computer system 116 to allow an employee 24 or other worker to manipulate the antenna back into the optimal orientation. The target sensing station 30 may then send an alert to the controller 16 indicative of the clothing item 106 moving past a the POS station 108 towards the front door of the venue 100. The controller 16 may contain an event module or alert module which the generates an alert message and communicates the alert message to a theft alert system or to the interface 128, in the event that the clothing item 106 was not properly paid for or purchased as the clothing item 106 approaches the front door of the venue 100. The employee 24 may then take proper action to prevent theft of the clothing item 106, decreasing potential loss of profits due to theft.

Figure 3:
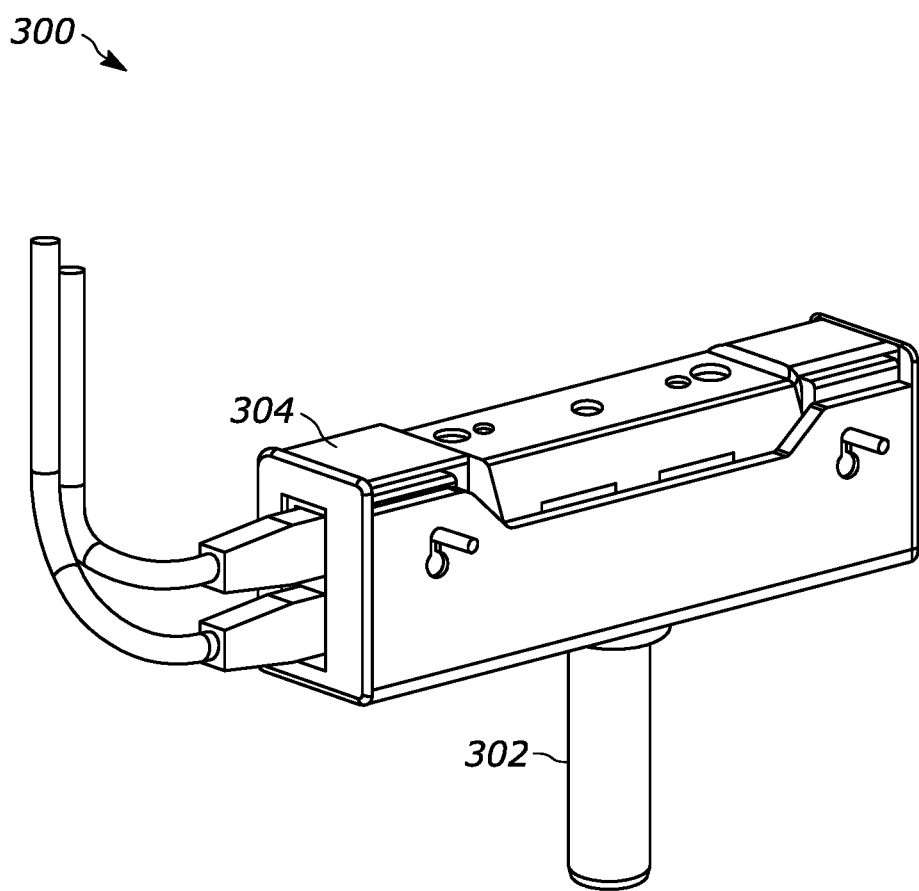
FIG. 3 is a perspective view of an RFID sensing station in FIGS. 1 and 2, and in accordance with embodiments described herein.

FIG. 3 is a perspective view of an example RFID sensing station 300 capable of detecting and analyzing movement associated with the antenna 302. The example RFID sensing station 300 may be enclosed in a housing 304 that is mounted to a surface (e.g., ceiling, wall, support structure, etc.) within and/or near a storage facility (e.g., venue 10, 100). Generally, the housing 304 may be removably mounted to a surface to facilitate repositioning of the RFID sensing station 300, maintenance of the station 300, or any other suitable reason. Typically, however, the housing 304 may be mounted (e.g., during installation) to a surface using unmovable hardware, such that the antenna may not easily rotate, pivot, or otherwise move from the optimal orientation achieved at installation. In this manner, the RFID sensing station 300 may quickly and accurately locate and track moving objects within and/or near the corresponding storage facility without interference from vibrations within a venue due to heavy machinery or environmental conditions (e.g., thunderstorms, hail, earthquakes, etc.), HVAC systems, or direct physical contact with the RFID sensing station 300.

The antenna 302 may additionally include a tilt sensor (not shown). Generally, the tilt sensor may be an accelerometer, and may measure the acceleration of the antenna. The tilt sensor may make periodic evaluations of the acceleration of the antenna 302, the tilt sensor may provide a real-time continuous stream of acceleration data associated with the antenna 302, or any combination thereof. As illustrated, the antenna 302 may generally be oriented in a downward-facing direction towards the floor of the corresponding storage facility to optimally receive signals from the tagged objects below. Accordingly, this downward-facing orientation may correspond to an acceleration signal recorded by the tilt sensor that may be identified as an acceleration signature of the optimal orientation of the antenna 302. If vibrations or other interference cause the antenna 302 to rotate or shift away from the downward-facing direction (e.g., askew to the right, left, back, and/or front), then the tilt sensor may record an acceleration signal that differs from acceleration signature. The tilt sensor may send this acceleration signal to a processor (not shown) contained within the RFID sensing station 300 to determine that the antenna has moved (e.g., is misaligned), and in embodiments, adjust signals received by the antenna 302 accordingly and/or how to realign the antenna 302.

Figure 4:
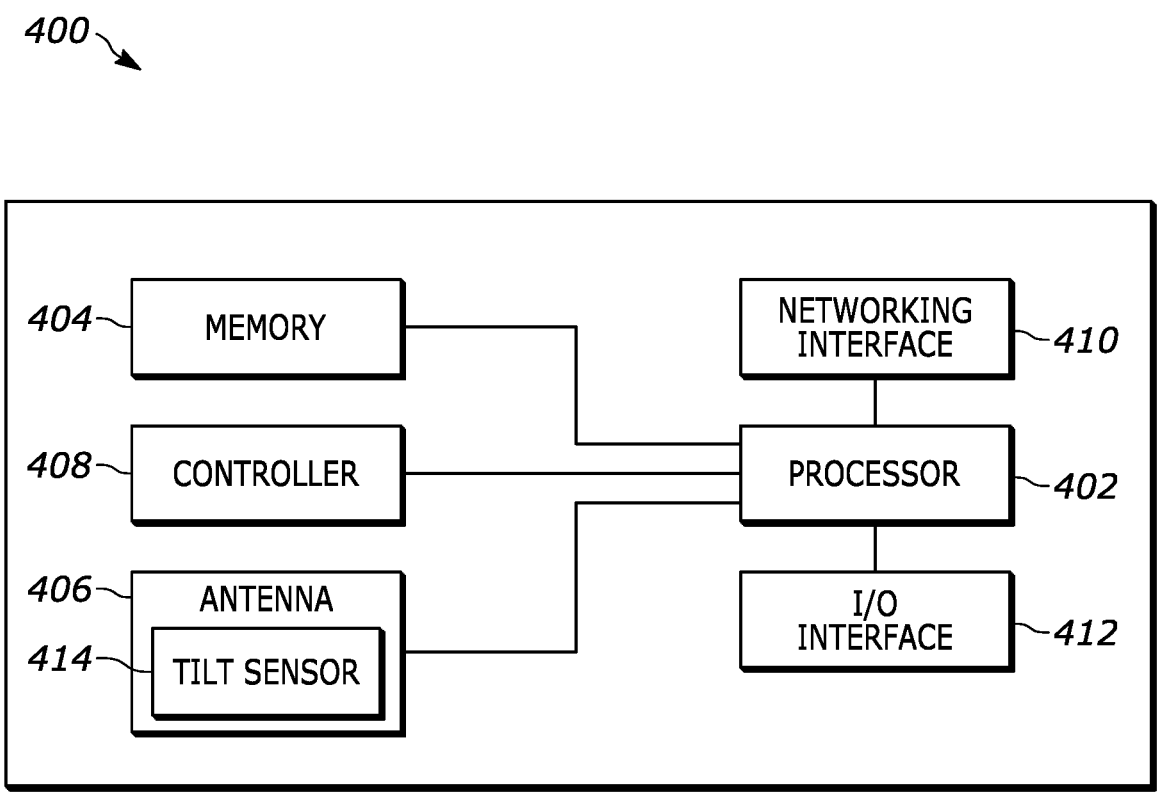
FIG. 4 is a block diagram representative of an example logic circuit capable of generating and analyzing acceleration signals, in accordance with embodiments described herein.

FIG. 4 is a block diagram representative of an example logic circuit capable of implementing, for example, one or more components of the example systems and specifically an example RFID sensing station 400 (e.g., RFID sensing station 30). The RFID sensing station 30 may generally capture location data from one or more RFID tags within a venue (e.g., venue 10, 100). This location data may be transmitted to a controller (e.g., controller 16) which receives location data from a plurality of the RFID sensing stations, and subsequently used for triangulation and/or trilateration to determine locations of the RFID tags within the venue.

The example RFID sensing station 400 includes a processor 402, such as, for example, one or more microprocessors, controllers, and/or any suitable type of processor. The example RFID sensing station 400 further includes memory (e.g., volatile memory or non-volatile memory) 404 accessible by the processor 402, for example, via a memory controller (not shown). The example processor 402 interacts with the memory 404 to obtain, for example, machine-readable instructions stored in the memory 404.

Generally speaking, the example RFID sensing station 400 is operated, under the control of the processor 402, to transmit RF beams to the tags on the targets, and to receive RF response signals from the tags, thereby interrogating and processing the payloads of the tags that are in a reading zone of the RFID target sensing station 400. The RFID reading zone may be defined by the antenna 406 and controlled through beam steering by a controller 408. During operation, the RFID sensing station 400 captures payload data or target data that identifies the tags and their associated products (e.g., moveable products 12). The controller 408 then controls the RIFD sensing station 400 to read the tags on the products in a reading mode of operation in accordance with a set of reading parameters.

The example RFID sensing station 400 may further include a network interface 410 to enable communication with other machines via, for example, one or more computer networks, such as a local area network (LAN) or a wide area network (WAN), e.g., the Internet. The example network interface 410 may include any suitable type of communication interface(s) (e.g., wired and/or wireless interfaces) configured to operate in accordance with any suitable protocol(s), e.g., Ethernet for wired communications and/or IEEE 802.11 for wireless communications. For example, the processor 402 may communicate with a centralized controller through the network interface 410 to coordinate reading of RFID tags, and the processor 402 may provide the central controller with bearing information of an RFID tag for the central controller to determine the location of an RFID tag in a venue. Moreover, the example RFID sensing station 400 includes input/output (I/O) interfaces 412 to enable receipt of user input and communication of output data to the user, which may include, for example, any number of keyboards, mice, USB drives, optical drives, screens, touchscreens, etc.

As mentioned, the example RFID sensing station 400 may include an antenna 406 operative for detecting and receiving an RFID tag signal to determine a static location of a target object and/or the position of the target object as it moves within a venue (e.g., venues 10 and 100). More particularly, the antenna 406 includes a tilt sensor 414 configured to measure and record acceleration signals associated with the antenna 406. The tilt sensor 414 may be, for example, an accelerometer, and may include one or more processors (not shown) to independently analyse the measured acceleration signals and generate alert signals.

For example, and as described further herein, upon installation of the example RFID sensing station 400 in a venue, the tilt sensor 414 may measure an acceleration signal associated with the antenna that represents an acceleration signature of the antenna when properly oriented. The tilt sensor 414 may transmit the acceleration signature measurement to memory 404 for storage. Thereafter, the tilt sensor 414 may measure and analyse acceleration signals associated with the antenna 406 by comparing the acceleration signals to the acceleration signature stored in memory 404. If the acceleration signals deviate beyond a threshold amount from the acceleration signature, the tilt sensor 414 may generate an alert signal indicating to a user (e.g., an employee 24 at a computer system 116) that the antenna has moved (e.g., is misaligned). In embodiments, the tilt sensor 414 may additionally generate an adjustment instruction indicating to a user how to adjust the antenna 406 to restore it to the optimal orientation. It is to be appreciated, that the analysis described above and herein may be performed by the tilt sensor 414 and/or the processor 402 of the example RFID sensing station 400.

The arrangement for locating and tracking a target in a venue may include the controller 408 having one or more processors and one or more memories. The arrangement may include a plurality of target sensing stations deployed throughout a venue. Those target sensing stations may, for example, be deployed in overhead positions throughout the venue. Further, in embodiments, the example RFID sensing station 400 may include elements not illustrated in FIG. 4 such as an RFID tag database which may store information associated with a plurality of RFID tags such as current locations of the plurality of RFID tags, a history of locations of the RFID tags, associated items or products physically coupled to the RFID tags, etc.

Figure 5:
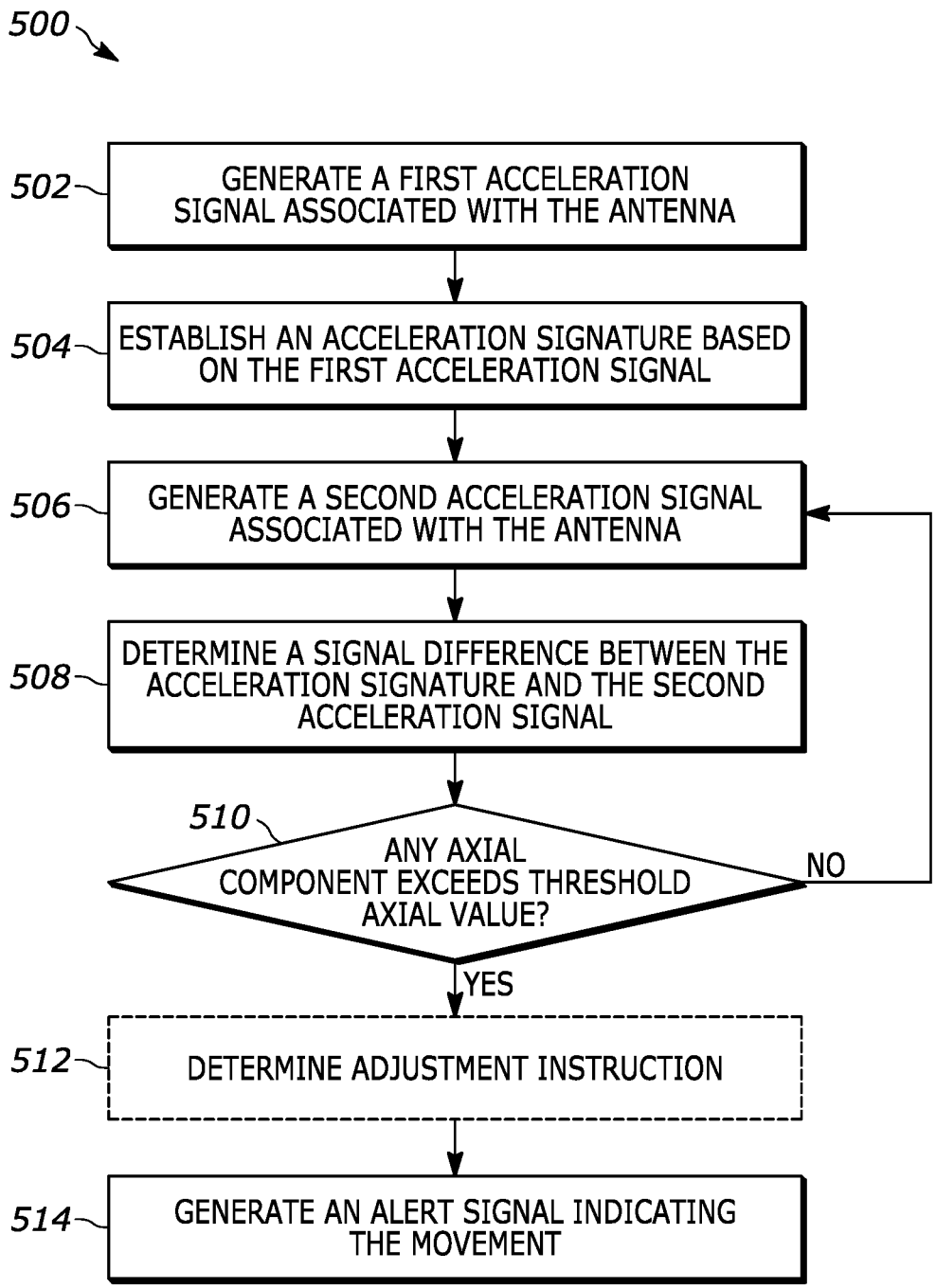
FIG. 5 is a flow diagram representative of a method for determining movement associated with an antenna of a receiver, in accordance with embodiments described herein.

FIG. 5 is a flow diagram representative of a method 500 for determining movement associated with an antenna of a receiver. Generally, a tilt sensor may be incorporated in the antenna, and may therefore detect movement of the antenna. More specifically, the tilt sensor may detect acceleration associated with the antenna that may then be translated into a corresponding movement of the antenna. The movement may be associated with, for example, any contact, vibrations, jostling and/or other force applied to the antenna causing the antenna to rotate or pivot from one position to a different position. However, a tilt sensor (e.g., accelerometer) may always generate an acceleration signal featuring at least the acceleration due to gravity. As a result, any given acceleration signal may only be indicative of movement if the components of the acceleration signal differ from some reference acceleration signal. Thus, in order to translate an acceleration into a corresponding movement, the reference acceleration signal must be established first.

Accordingly, the method 500 may begin by generating a first acceleration signal associated with the antenna (block 502). The first acceleration signal may correspond to an acceleration signal generated by the tilt sensor, for example, after installation of the receiver (e.g., RFID sensing station 300). The first acceleration signal may include one or more axial components, and at least one of the one or more axial components may be substantially non-zero. In embodiments, the tilt sensor may include an accelerometer. Block 502 may be performed by, for example, the tilt sensor 414.

The method 500 may continue by establishing an acceleration signature based on the first acceleration signal (block 504). The acceleration signature may correspond to the antenna, and may generally have three components. For example, assume that an RFID sensing station containing an antenna and a tilt sensor as described herein is installed at a warehouse or other venue (e.g., venue 10, 100). During installation a technician may optimally orient the antenna in a downward-facing direction toward the venue floor, and the tilt sensor may generate the first acceleration signal afterwards. Further assume that first acceleration signal includes three components associated with three principal axes of acceleration (e.g., x, y, and z). Accordingly, the first acceleration signal may be represented by a vector quantity of the type:

$$\vec{a} = A\hat{x} + B\hat{y} + C\hat{z} \qquad (1)$$

where A, B, and C are scalar values ranging from 0 G to 1 G, G represents the gravitational force of the Earth (~9.8 m/s²), and $\hat{x}$, $\hat{y}$, and $\hat{z}$ represent unit vectors in three distinct directions. As a simplified example, the first acceleration signal may be:

$$\vec{a} = 0\hat{x} + 0\hat{y} + 1\hat{z} \qquad (2)$$

where $\hat{z}$ represents a unit vector in the downward-facing direction toward the venue floor. In practice, it may be impractical to orient the antenna in a strictly downward-facing direction. As a result, the tilt sensor may not likely generate an acceleration signal with a precisely zero value for one or more of the scalars associated with the unit vectors. In any event, the tilt sensor may generate a first acceleration signal incorporating the values represented in equation (2), and save the first acceleration signal as the acceleration signature associated with the antenna.

Alternatively, the antenna may be optimally oriented in a direction that is not primarily downward-facing toward the venue floor. For example, an RFID sensing station may be positioned in a corner of a warehouse or other venue. Many of the tagged objects may be located nearer to the venue interior center, and as such, the RFID sensing station antenna optimal orientation may include rotating the antenna towards the venue interior center. Accordingly, upon installation, the tilt sensor may generate a first acceleration signal similar to:

$$\vec{a} = 0.3\hat{x} + 0.3\hat{y} + 0.9\hat{z} \qquad (3)$$

which the tilt sensor may then save as the acceleration signature associated with the antenna.

In embodiments, the RFID sensing station may be one of a plurality of RFID sensing stations positioned throughout a venue. Generally speaking, when a tagged object is moved through a venue, multiple RFID sensing stations may likely receive response signals from the tag associated with the tagged object. The multiple received response signals may be analysed collectively to determine (e.g., via triangulation and/or trilateration) a position of the tagged object. Consequently, an installation technician may use the position of the tagged object to validate whether a particular antenna or antenna array is optimally aligned. Namely, if the determined position of the tagged object is accurate, then the technician may conclude that the received signals were not skewed due to misaligned antennae associated with the RFID sensing stations. Accordingly, each RFID sensing station may have one or more antennas, and each station may receive an RFID tag signal corresponding to a tagged object. An individual RFID sensing station and/or a backend hub (e.g., controller 16) may then determine a location associated with the tagged object based on the received response signals, each containing the RFID tag signal of the tagged object. Moreover, the RFID sensing station (e.g., via processor 402) or backend hub may establish the acceleration signature corresponding to an antenna of the RFID sensing station based on the first acceleration signal and the location of associated with the object. The RFID sensing station and/or backend hub may automatically establish the acceleration signature, or they may receive an input via an operator/technician indicating that the RFID sensing station antenna is properly/optimally aligned.

The method 500 may continue by generating a second acceleration signal associated with the antenna (block 506). The second acceleration signal may include one or more axial components, and at least one of the one or more axial components may be substantially non-zero. In embodiments, the tilt sensor included in an antenna may generate acceleration signals according to a predetermined frequency. For example, the tilt sensor may generate the first acceleration signal at a time to and may generate the second acceleration signal at a time ti after a duration D. The duration D may be any duration such as, without limitation, one minute, ten minutes, one hour, twelve hours, five days, or any suitable duration or combination thereof. Block 506 may be performed by, for example, the tilt sensor 414.

In embodiments, the tilt sensor included in the antenna may continuously generate acceleration signals. The tilt sensor may generate a real-time, near real-time, and/or a delayed continuous stream of acceleration data corresponding to the antenna. For example, the first acceleration signal may include a continuous stream of acceleration data representing a substantially consistent acceleration corresponding to the antenna. To illustrate, the first acceleration signal may include an acceleration vector similar to equation (2) that an antenna substantially maintains during a first timeframe T. Namely, each component of the acceleration vector (e.g., scalar values A, B, and C associated with the unit vectors) may vary by a few percentage points away from the scalar values represented in equation (2) at various points throughout the first timeframe T.

Continuing this example, the antenna may receive some external force (e.g., via vibrations, direct physical contact, etc.) causing the antenna to pivot, rotate, or otherwise change position after the first timeframe T has elapsed. The tilt sensor may continue to generate acceleration data, but the data may now correspond to the second acceleration signal, and may have components similar to the acceleration vector of equation (3). Moreover, the tilt sensor may generate the second acceleration signal at any point following the first timeframe T, and may incorporate a delay when generating the second acceleration signal. The delay may facilitate reducing the number of false alarms generated by the tilt sensor, as described further herein.

The method 500 continues by determining a signal difference between the acceleration signature and the second acceleration signal (block 508). Generally speaking, signal difference may represent one or both of an indication whether the second acceleration signal indicates a re-positioning of the antenna with respect to the RFID sensing station and a degree to which the antenna has been re-positioned. The accelerometer may generate acceleration data in response to any movement associated with the antenna. This movement may include a technician/worker repositioning the RFID sensing station, removing the RFID sensing station to perform maintenance on the station, or any other suitable reason. However, these movements associated with the entire RFID sensing station may not indicate a re-positioning of the antenna with respect to the RFID sensing station (e.g., a pivot, a rotation, an angular displacement, etc.). Moreover, movements associated with the entire RFID sensing station may generate a larger magnitude acceleration signal than the acceleration signature associated with the antenna because the movement may include acceleration attributable to physical displacement in addition to the acceleration resulting from the force of gravity. Block 508 may be performed by, for example, the tilt sensor 414.

Accordingly, the tilt sensor may check that the second acceleration signal is indicative of a re-positioning of the antenna with respect to the RFID sensing station by comparing the total magnitude of the second acceleration signal to the acceleration signature. The total magnitude of the second acceleration signal and the acceleration signature may be calculated in the following manner:

$$|\vec{a}| = \sqrt{A^2 + B^2 + C^2} \quad (4)$$

where A, B, and C are the scalar values described in reference to equation (1). For example, the acceleration signature may have a vector representation similar to equation (2), such that the total magnitude of the acceleration signature is equivalent to the gravitational force of the Earth G (e.g., ~9.8 m/s²). The second acceleration signal may have a vector representation similar to equation (3), such that the total magnitude of the second acceleration signature is equivalent to 0.995 times the gravitational force of the Earth G. The tilt sensor may determine that the total magnitude difference between the acceleration signature and the second acceleration signal may be small enough that the tilt sensor may categorize the second acceleration signal as representative of an acceleration corresponding to the antenna, as opposed to the RFID sensing station. Thus, in embodiments, the total magnitude of the acceleration signature may be equivalent or substantially equivalent to the total magnitude of the second acceleration signal. The tilt sensor may then determine that the signal difference may be attributable to a movement of the antenna, and may exclude movement of the receiver (e.g., RFID sensing station).

As another example, the second acceleration signal may have a vector representation given by:

$$\vec{a} = 1\hat{x} + 2\hat{y} + 2\hat{z} \quad (5)$$

such that the total magnitude of the second acceleration signal is equivalent to three times the gravitational force of the Earth G. The tilt sensor may determine that the total magnitude of the second acceleration signal exceeds the total magnitude of the acceleration signature by greater than a total magnitude threshold amount. As a result, the tilt sensor may not characterize the second acceleration signal represented by equation (5) as a movement associated with a re-positioning of the antenna with respect to the RFID sensing station (e.g., a pivot, a rotation, an angular displacement, etc.).

The tilt sensor may also determine a signal difference between the second acceleration signal and the acceleration signature by determining a degree to which the antenna has been re-positioned. In reference to a prior example, the tilt sensor may determine that a second acceleration signal with a total magnitude of 0.995 times the gravitational force of the Earth G may represent a re-positioning of the antenna when the acceleration signature has a vector representation consistent with equation (2). The tilt sensor may further determine differences between each pair of component values (e.g., 0.3 G, 0.3 G, and 0.1 G for the $\hat{x}$, $\hat{y}$, and $\hat{z}$ components of the second acceleration signal, and 0 G, 0 G, and 1 G for the $\hat{x}$, $\hat{y}$, and $\hat{z}$ components of the acceleration signature). Thus, the tilt sensor or other suitable processor may determine that the antenna has been re-positioned resulting in a change of 0.3 G in the $\hat{x}$ direction (e.g., the direction associated with the $\hat{x}$ component), 0.3 G in the $\hat{y}$ direction, and 0.1 G in the $\hat{z}$ direction.

In embodiments, the acceleration signature may include one or more threshold axial components. These threshold axial components may represent deviations from each of the acceleration signature components that facilitate the tilt sensor determining a re-positioning of the antenna with respect to the RFID sensing station. For example, the acceleration signature may include threshold axial components that allow a five percent deviation from the $\hat{x}$ component of the acceleration signature, a ten percent deviation from the $\hat{y}$ component of the acceleration signature, and a ten percent deviation from the $\hat{z}$ component of the acceleration signature. Additionally or alternatively, the threshold axial components may be predetermined numerical values corresponding to each axial component, such as 0.3 G in the $\hat{x}$ component, 0.1 G in the $\hat{y}$ component, and 0.2 G in the $\hat{z}$ component, and/or any other suitable threshold representation with respect to the acceleration signature.

Further in these embodiments, the method 500 may continue by determining whether any axial component of the second acceleration signal exceeds the corresponding threshold axial value (block 510). The tilt sensor may compare each axial component of the second acceleration signal to a corresponding threshold axial component of the acceleration signature. If the tilt sensor determines that no axial components of the second acceleration signal exceed the corresponding threshold axial value, the method 500 may return to block 506 (NO branch of block 510). If the tilt sensor determines that at least one axial component of the second acceleration signal exceeds the corresponding threshold axial value, the method may continue to block 514 (YES branch of block 510). In embodiments, the method 500 may continue to optional block 512 if the tilt sensor determines that at least one axial component of the second acceleration signal exceeds the corresponding threshold axial value. Block 510 may be performed by, for example, the tilt sensor 414.

Continuing the above example, the acceleration signature may have a vector representation similar to equation (2), and the second acceleration signal may have a vector representation given by equation (3). The tilt sensor or other processor may calculate a difference between each component of the acceleration signature and the second acceleration signal to determine difference values of 0.3 G, 0.3 G, and 0.1 G for the $\hat{x}$, $\hat{y}$, and $\hat{z}$ components, respectively. The tilt sensor may then compare the difference values to each of the corresponding threshold axial components. Namely, the tilt sensor may compare the 0.3 G difference value in the $\hat{x}$ component to the 0.3 G $\hat{x}$ component threshold, the 0.3 G difference value in the $\hat{y}$ component to the 0.1 G $\hat{y}$ component threshold, and the 0.3 G difference value in the $\hat{z}$ component to the 0.2 G $\hat{z}$ component threshold. Accordingly, the tilt sensor may determine that the $\hat{y}$ and $\hat{z}$ components of the second acceleration signal exceed the corresponding threshold axial components.

Still further in these embodiments, the tilt sensor may calculate the difference values for each component of the second acceleration signal and determine whether any difference value exceeds the corresponding threshold axial value prior to determining the signal difference. Broadly, the tilt sensor may compare each difference value to the corresponding threshold axial value, and responsive to determining that at least one difference value associated with an axial component of the second acceleration signal exceeds the corresponding threshold axial value, the tilt sensor may then determine the signal difference between the acceleration signature and the second acceleration signal, as described above. In this manner, the tilt sensor may presume the second acceleration signal is associated with a re-positioning of the antenna to remove the additional processing step of confirming that presumption. However, if the second acceleration signal deviates from the acceleration signature such that at least one difference value exceeds the corresponding threshold axial value, the tilt sensor may check that the second acceleration signal is associated with a re-positioning of the antenna (e.g., determine the signal difference).

Additionally or alternatively, in embodiments, the antenna may receive a distorted RFID tag signal that prompts the tilt sensor to generate a second acceleration signal. For example, an antenna may be re-positioned and thereafter receive a distorted or skewed RFID tag signal, or the antenna may not receive an RFID tag signal at all when surrounding RFID sensing stations receive an RFID tag signal. In any event, the RFID sensing station may attempt to interpret the distorted RFID tag signal. Responsive to being unable to interpret the distorted RFID tag signal, the tilt sensor may generate a second acceleration signal. The tilt sensor or other suitable processor (e.g., processor 402) may then determine the signal difference between the acceleration signature and the second acceleration signal.

Further in these embodiments, and in situations where a first antenna fails to receive a RFID tag signal when other surrounding RFID sensing stations receive the RFID tag signal, a server (e.g., controller 16) or other processor may calculate the position of the tagged object based upon the received RFID tag signals. The server and/or the processor associated with the first antenna may determine whether the first antenna should have received an RFID tag signal based upon the position of the tagged object. The tilt sensor may then generate a second acceleration signal and proceed to determine the signal difference between the second acceleration signal and the acceleration signature if the server and/or processor determine the first antenna should have received the RFID tag signal, but did not (e.g., indicating a misalignment of the first antenna).

The method 500 may optionally continue by determining an adjustment instruction to correct the orientation of the antenna (optional block 512). Generally speaking, the tilt sensor and/or other processor (e.g., processor 402) may evaluate the signal difference between the second acceleration signal and the acceleration signature to determine how the antenna should be adjusted to return the antenna to the optimal orientation (e.g., as indicated by the acceleration signature). The tilt sensor and/or other processor may translate the components of the signal difference into directional instructions that a technician/worker may use to re-orient the antenna. The adjustment instruction may include any suitable indication such as alphanumeric characters, symbols, colors, graphics, videos, patterns, and/or other audio/visual indications. For example, the tilt sensor may determine that the antenna should be moved to the right in an effort to place the antenna in the center of its range of motion (e.g., pointing at a venue floor if hung from the venue ceiling). Block 512 may be performed by, for example, the tilt sensor 414.

The method 500 may continue by generating an alert signal indicating the movement (block 514). Generally, once the tilt sensor determines that one or more axial component(s) of the second acceleration signal exceeds a threshold axial value included in the acceleration signature, the tilt sensor may automatically proceed to generate the alert signal. The alert signal may indicate to a user/technician that the antenna has been re-positioned in a non-optimal manner, and may further indicate the RFID sensing station including the antenna (e.g., such as by an ID or by a pictorial layout of the venue with the RFID sensing station highlighted therein). The tilt sensor may transmit the alert signal (e.g., via the networking interface 410) to a central controller (e.g., controller 16) for delayed distribution to a technician/worker or directly to a computer system for immediate display to a user (e.g., via interface 128 of computer system 116). The alert signal may further indicate any adjustment instructions that may have been determined by the tilt sensor and/or other processor (e.g., processor 402), and may further include any accompanying graphics, audio/visual cues, alphanumeric characters, videos, symbols, colors, patterns, and/or other suitable indications. Block 514 may be performed by, for example, the tilt sensor 414.

In embodiments, at least one of the processor (e.g., processor 402) or the tilt sensor (e.g., tilt sensor 414) may generate the alert signal. Moreover, the processor and/or tilt sensor may include a timestamp associated with the second acceleration signal in the alert signal. Generally, each acceleration signal generated by the tilt sensor may include an associated timestamp to record when the acceleration signal was generated. Each associated timestamp may be recorded in memory (e.g., memory 404), and may be accessed by the tilt sensor and/or processor when generating the alert signal. For example, the tilt sensor and/or processor may generate an alert signal that identifies an RFID sensing station corresponding to the re-positioned antenna and a timestamp indicating when the antenna was determined to be re-positioned, such as "Unit XX, out of alignment at time XX," or any other suitable wording.

Additionally or alternatively, in embodiments, the tilt sensor and/or processor may at least one of (i) adjust the acceleration signature to correspond to the second acceleration signal or (ii) compensate (e.g., via the antenna 406) a power level associated with subsequent generated acceleration signals when generating the alert signal. As mentioned, the acceleration signature may represent the optimal orientation of the antenna for a given mounting of the corresponding RFID sensing station within a venue. However, the acceleration signature may not remain optimal in the event that the RFID sensing station is mounted it a different location within the venue. Thus, in response to generating the alert signal, the tilt sensor may optionally establish the second acceleration signal as the acceleration signature. For example, the alert signal may include an option for a technician/worker to re-establish the acceleration signature in the event that the RFID sensing station has been moved and/or repositioned within the venue.

Further in these embodiments, the antenna may adjust a power level associated with emitted signals to compensate for the movement. The antenna may experience difficulty receiving RFID tag signals from tagged objects because the antenna is not optimally oriented. To elevate the chance of receiving RFID tag signals, the antenna may increase or otherwise adjust the power level of emitted signals. In this manner, the antenna may continue to receive RFID tag signals and participate in the triangulation/trilateration process until the antenna is re-aligned. Once the antenna is re-aligned, the tilt sensor may generate a subsequent acceleration signal, compare it to the acceleration signature, and determine a successful realignment. The tilt sensor and/or the processor (e.g., processor 402) may then cause the antenna to readjust the power level associated with the emitted signals.

In embodiments, the tilt sensor and/or other processor may automatically generate and transmit an alert signal to a user device (e.g., handheld device 22, computer system 116, interface 128) in an unsolicited manner. For example, the tilt sensor may automatically generate the alert signal, transmit the alert signal to the user device, and cause the user device to display the alert signal upon receipt. Moreover, the alert signal may include a request for acknowledgement on behalf of a technician/worker to ensure that an appropriate party views and reads the alert signal.

Figure 6:
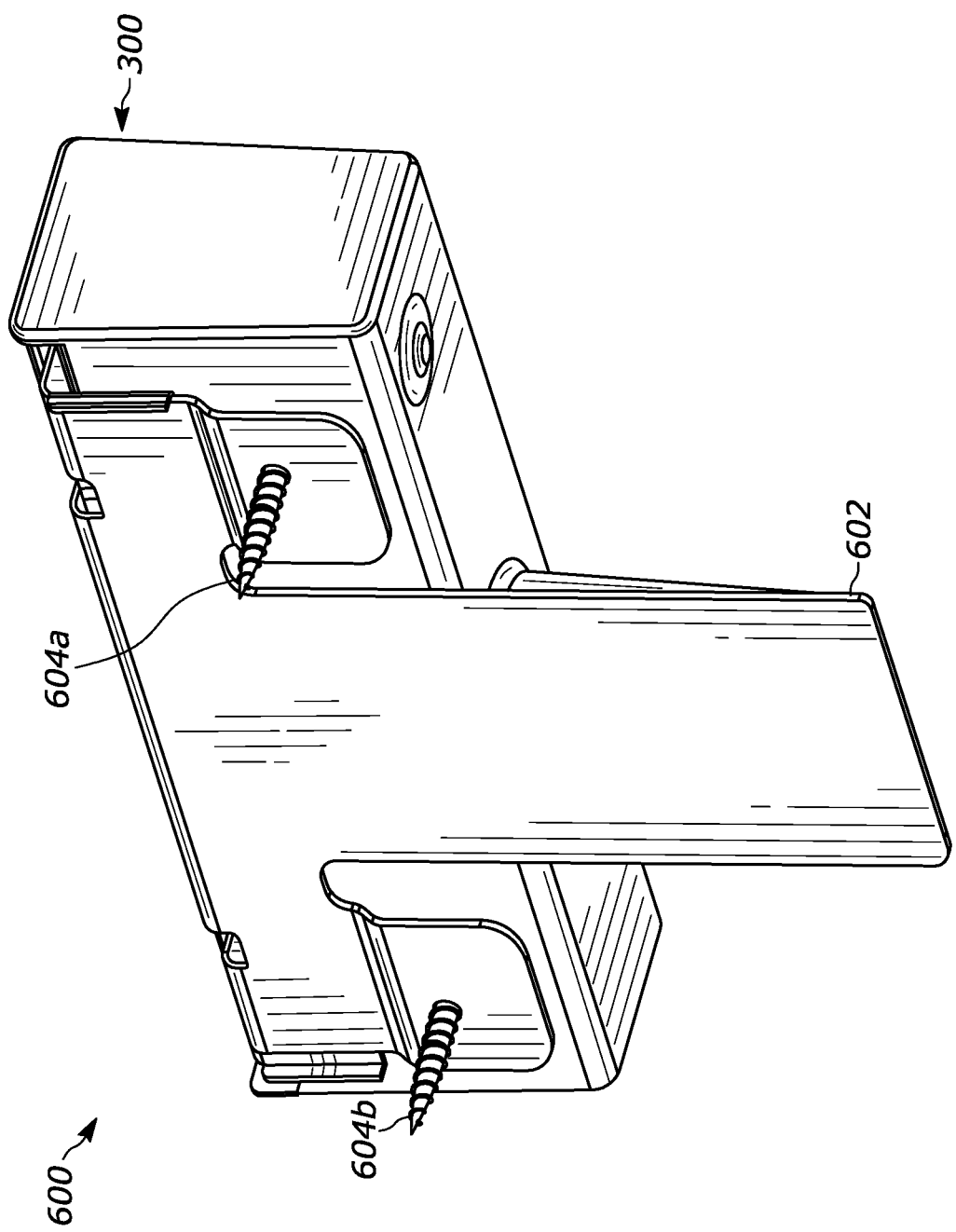
FIG. 6 is a first perspective view of an RFID sensing station in FIG. 3 having a mounting bracket, in accordance with embodiments described herein.
Figure 7:
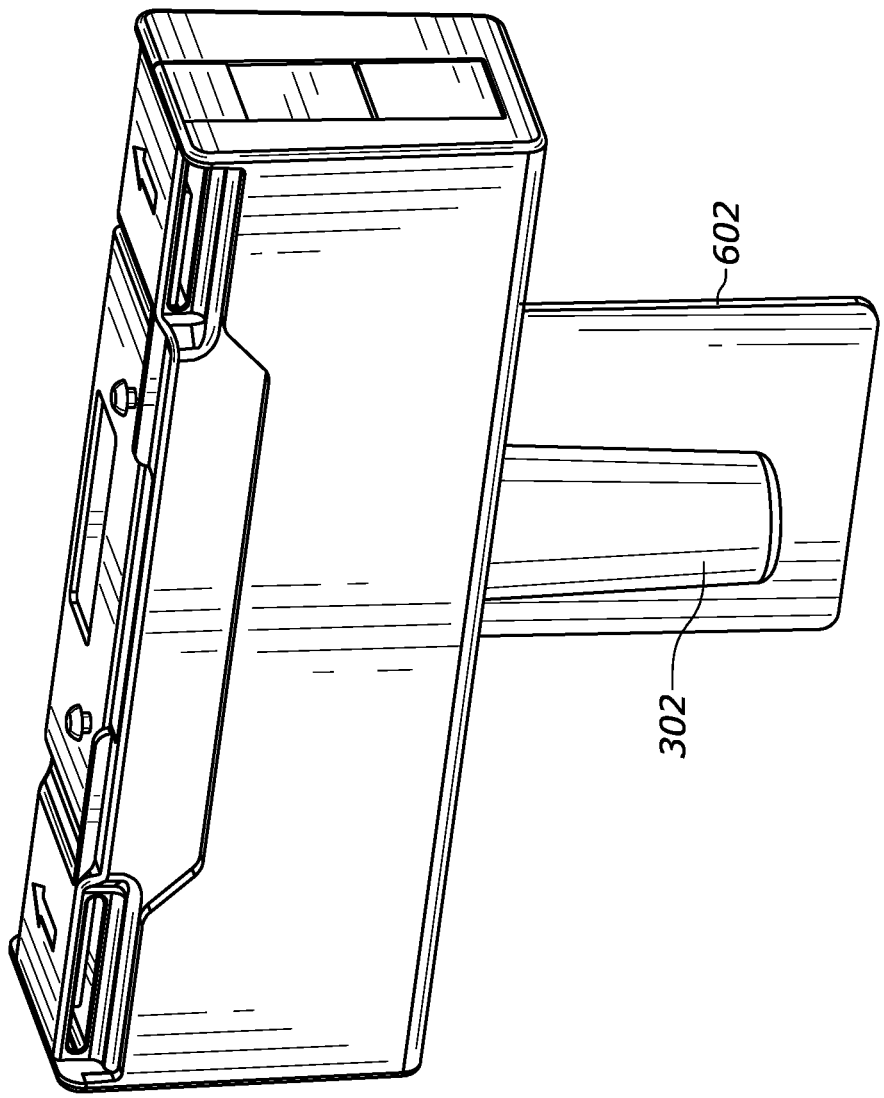
FIG. 7 is a second perspective view of the RFID sensing station having a mounting bracket, in accordance with embodiments described herein.
Figure 8:
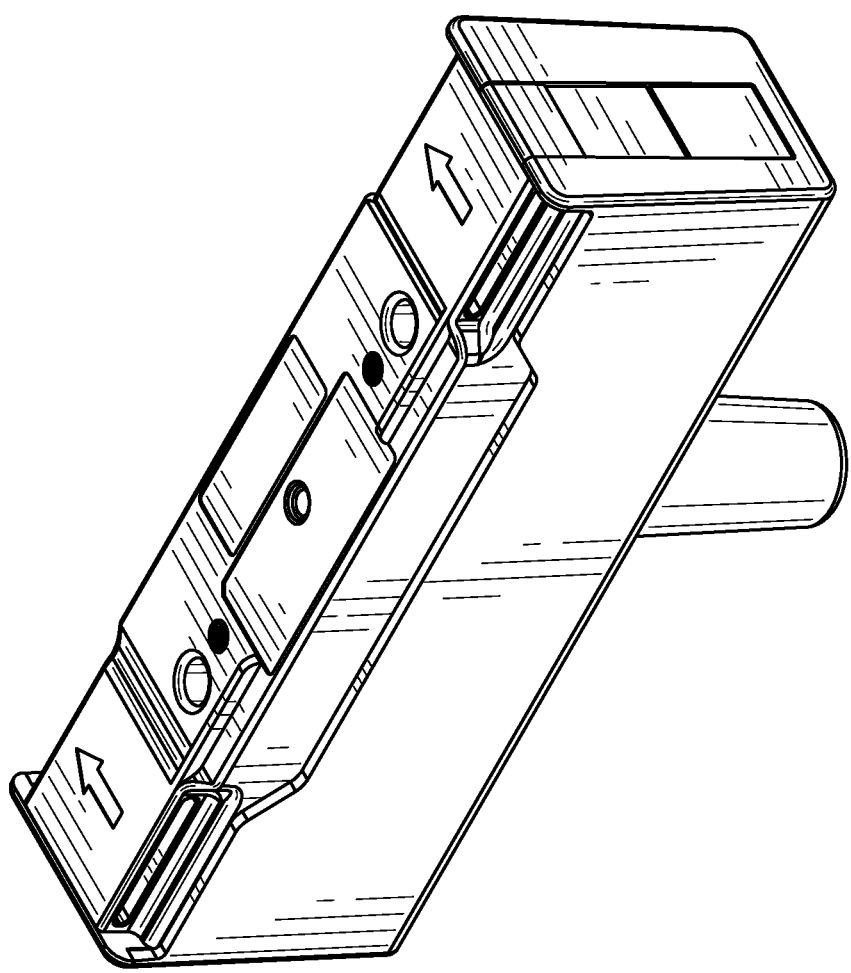
FIG. 8 is a front perspective view of a RFID sensing station, in accordance with embodiments described herein.
Figure 9:
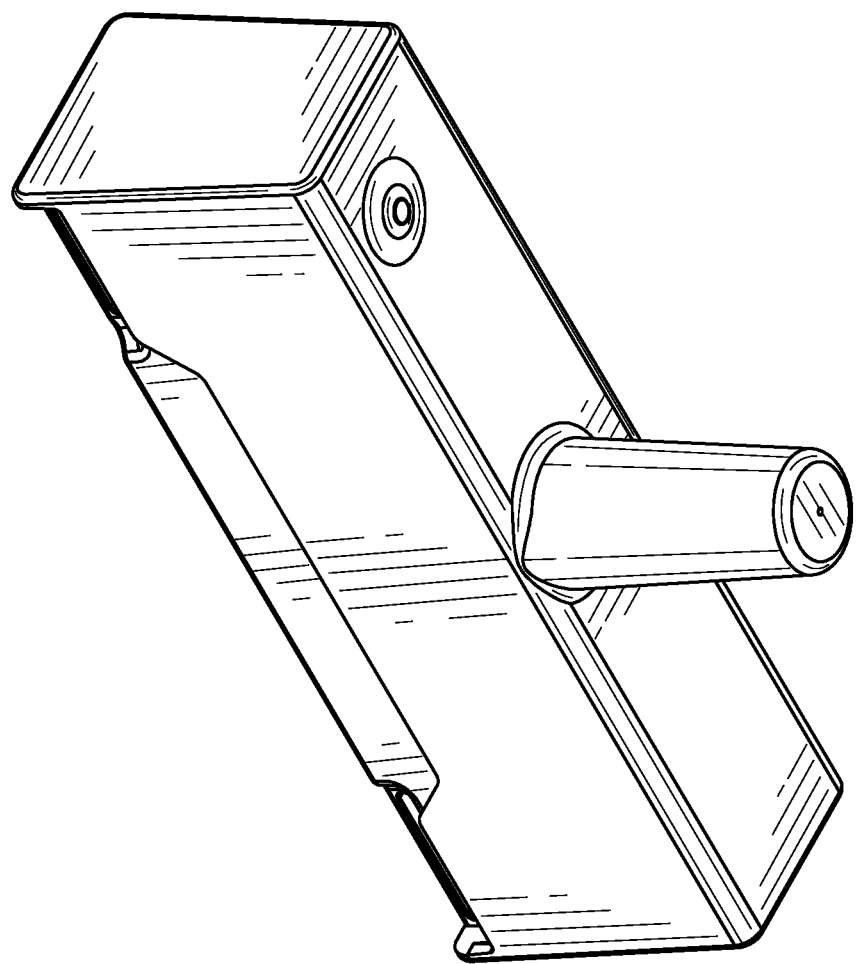
FIG. 9 is a rear perspective view of a RFID sensing station, in accordance with embodiments described herein.
Figure 10:
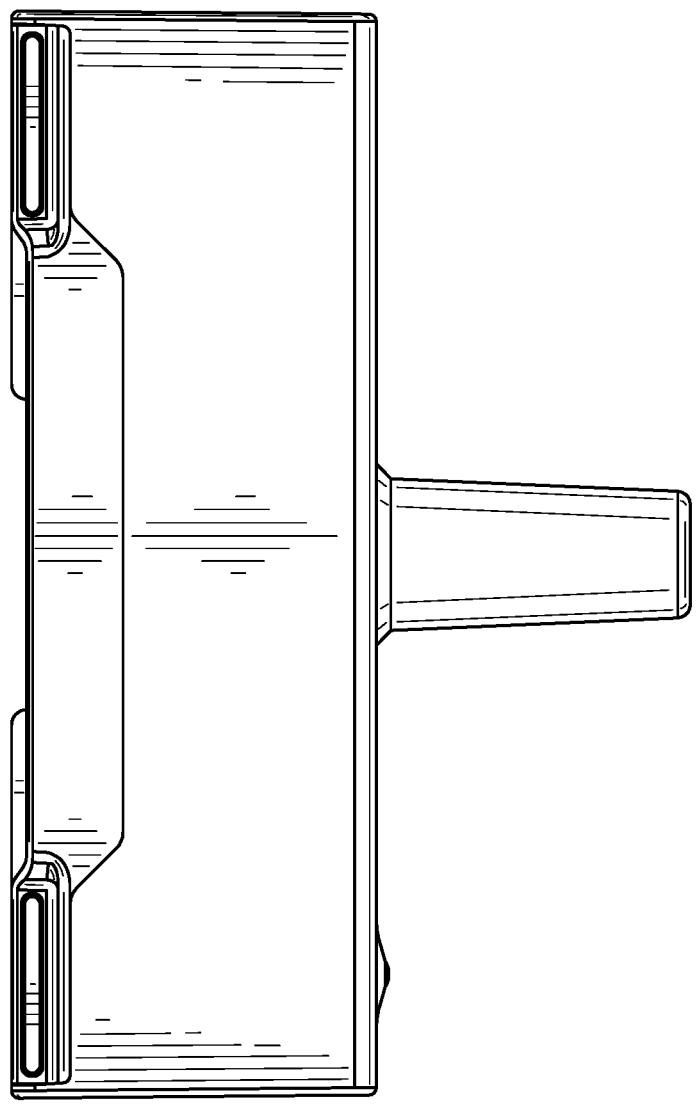
FIG. 10 is a front view of a RFID sensing station, in accordance with embodiments described herein.
Figure 11:
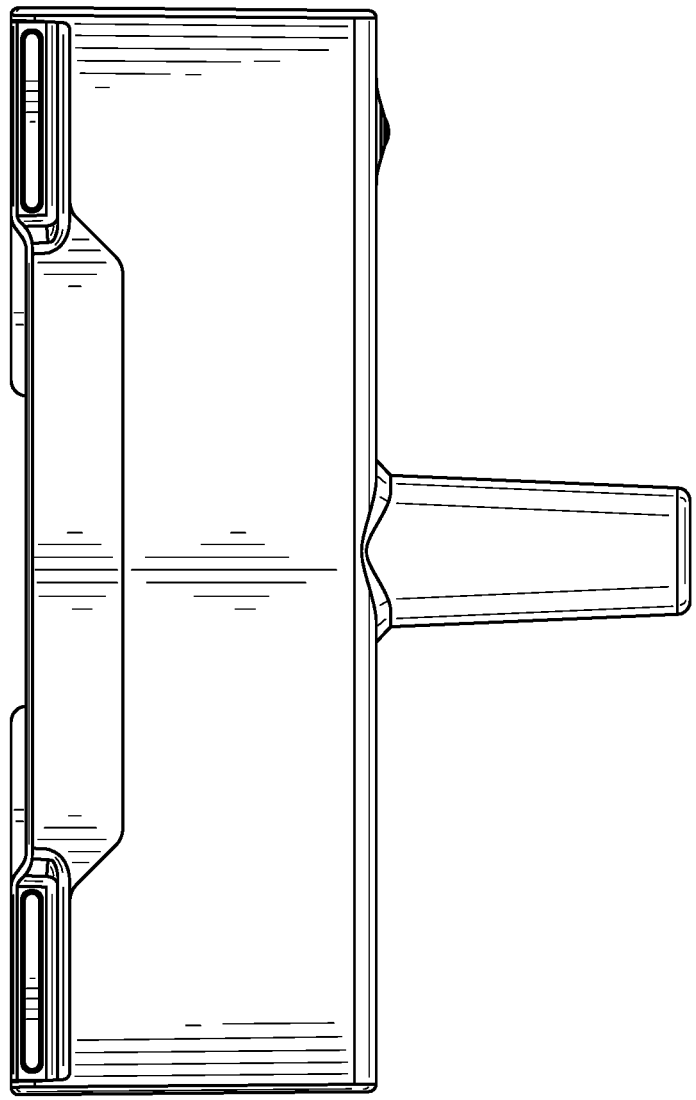
FIG. 11 is a rear view of a RFID sensing station, in accordance with embodiments described herein.
Figure 13:
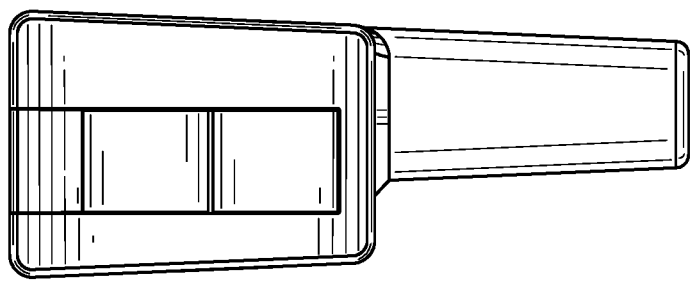
FIG. 13 is a second side view of a RFID sensing station, in accordance with embodiments described herein.
Figure 12:
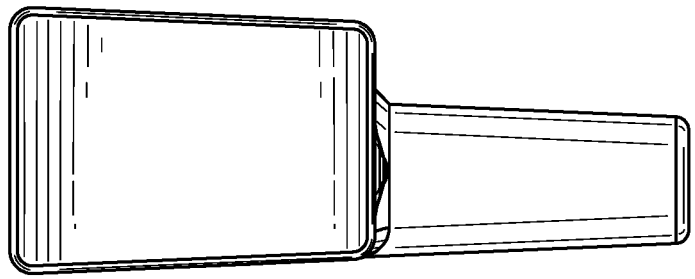
FIG. 12 is a first side view of a RFID sensing station, in accordance with embodiments described herein.
Figure 14:
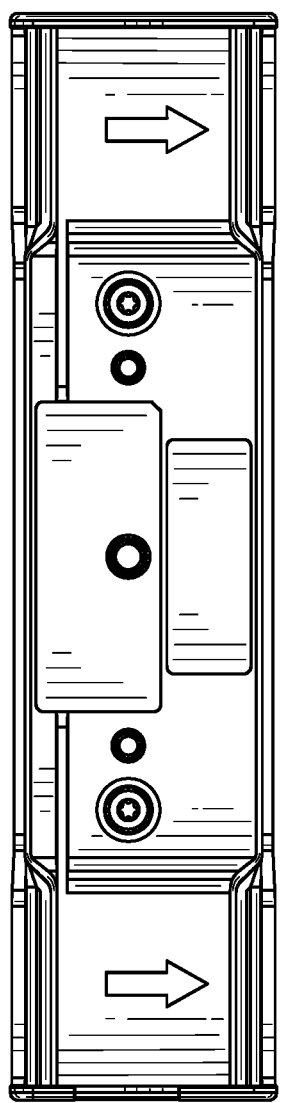
FIG. 14 is a top view of a RFID sensing station, in accordance with embodiments described herein.
Figure 15:
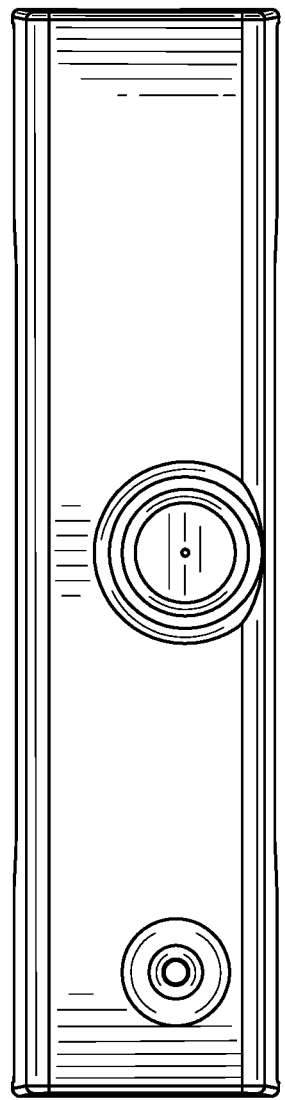
FIG. 15 is a bottom view of a RFID sensing station, in accordance with embodiments described herein.

The embodiment depicted in FIG. 6 shows the RFID sensing station 300 attached to a mounting bracket 600. The mounting bracket 600 allows the RFID sensing station 300 to be mounted to a wall or other sturdy surface. In the depicted embodiment, the mounting bracket 600 has a reflector plate 602 and fasteners 604a and 604b. The fasteners 604a and 604b are depicted as screws but can be any other type of fastener as known in the art capable of securing a mounting plate to a wall. The reflector plate 602 is positioned adjacent the antenna of the RFID sensing station 300, such that when the RFID sensing station 300 is mounted to a wall, the reflector plate 602 is between the wall and the antenna, capable of reflecting transmissions out from the antenna and back towards the antenna. This allows the antenna's radiation pattern to not be overly affected by the wall. The mounting bracket 600 is mounted to the wall via two fasteners 604a and 604b. The mounting bracket 600 is then able to receive the RFID sensing station 300 via two flanges extending from the mounting bracket 600 opposite from the reflecting plate 602. The two flanges mesh with the housing 300 to retain the RFID sensing station 300.

The above descriptions refers to the accompanying drawings. Alternative implementations of the examples represented by the block diagrams and figures include one or more additional or alternative elements, processes and/or devices. Additionally or alternatively, one or more of the example block of the diagrams or elements of the figures may be combined, divided, re-arranged or omitted. Components represented by the blocks of the diagrams and elements of the figures are implemented by hardware, software, firmware, and/or any combination of hardware, software and/or firmware. In some examples, at least one of the components represented by the blocks of elements of the figures is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples, the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for determining movement associated with an antenna of a receiver, the method comprising:
generating, via a tilt sensor included in the antenna, a first acceleration signal associated with the antenna, wherein the first acceleration signal includes one or more axial components, and at least one of the one or more axial components is substantially non-zero;
establishing, by a processor included in the receiver, an acceleration signature corresponding to the antenna based on the first acceleration signal;
generating, via the tilt sensor, a second acceleration signal associated with the antenna, wherein the second acceleration signal includes one or more axial components, and at least one of the one or more axial components are substantially non-zero;
determining, by the processor, a signal difference between the acceleration signature and the second acceleration signal, wherein the signal difference is attributable to a movement of the antenna; and
generating an alert signal indicating the movement,
wherein the receiver is one of a plurality of receivers, each receiver includes a respective antenna, and the method further comprises:
receiving, at each of the plurality of receivers, an RFID tag signal corresponding to an object;
determining, by one or more processors, a location associated with the object based on the RFID tag signal; and
establishing, by the processor included in the receiver, the acceleration signature corresponding to the antenna based on the first acceleration signal and the location associated with the object.

2. The method of claim 1, wherein the acceleration signature includes one or more threshold axial components, and the method further comprises:
comparing, by the processor, each axial component of the second acceleration signal to a corresponding threshold axial component of the acceleration signature; and
responsive to determining at least one axial component of the second acceleration signal exceeds the corresponding threshold axial component of the acceleration signature, determining, by the processor, the signal difference between the acceleration signature and the second acceleration signal.

3. The method of claim 2, wherein a total magnitude of the acceleration signature is equivalent to the total magnitude of the second acceleration signal.

4. The method of claim 1, further comprising:
analyzing, by the processor, the one or more axial components of the second acceleration signal to determine an adjustment instruction corresponding to the antenna; and
wherein the alert signal includes the adjustment instruction.

5. The method of claim 1, further comprising:
receiving, at the receiver, a distorted RFID tag signal;
attempting, by the processor, to interpret the distorted RFID tag signal; and
responsive to being unable to interpret the distorted RFID tag signal, determining, by the processor, the signal difference between the acceleration signature and the second acceleration signal.

6. The method of claim 1, wherein at least one of the processor or the tilt sensor generates the alert signal indicating the movement, the tilt sensor includes an accelerometer, the second acceleration signal includes a timestamp, and the alert signal includes the timestamp.

7. The method of claim 1, wherein a housing of the receiver is mounted in a fixed position via unmovable hardware.

8. The method of claim 1, wherein generating the alert signal further comprises at least one of (i) adjusting the acceleration signature to correspond to the second acceleration signal or (ii) compensating, via the antenna, a power level associated with subsequent generated acceleration signals.

9. A system for determining movement associated with an antenna of a receiver, comprising:
a tilt sensor included in the antenna and configured to:
generate a first acceleration signal associated with the antenna, wherein the first acceleration signal includes one or more axial components, and at least one of the one or more axial components is substantially non-zero, and
generate a second acceleration signal associated with the antenna, wherein the second acceleration signal includes one or more axial components, and at least one of the one or more axial components are substantially non-zero;
one or more processors included in the receiver; and
a non-transitory computer-readable memory coupled to the tilt sensor and the one or more processors, the memory storing instructions thereon that, when executed by the one or more processors, cause the one or more processors to:
establish an acceleration signature corresponding to the antenna based on the first acceleration signal,
determine a signal difference between the acceleration signature and the second acceleration signal, wherein the signal difference is attributable to a movement of the antenna, and
generate an alert signal indicating the movement,
wherein the receiver is one of a plurality of receivers, each receiver includes a respective antenna, each receiver receives an RFID tag signal corresponding to an object, and the instructions, when executed by the one or more processors, further cause the one or more processors to:

determine a location associated with the object based on the RFID tag signal; and
establish the acceleration signature corresponding to the antenna based on the first acceleration signal and the location associated with the object.

10. The system of claim 9, wherein the acceleration signature includes one or more threshold axial components, and the instructions, when executed by the one or more processors, further cause the one or more processors to:
compare each axial component of the second acceleration signal to a corresponding threshold axial component of the acceleration signature; and
responsive to determining at least one axial component of the second acceleration signal exceeds the corresponding threshold axial component of the acceleration signature, determine the signal difference between the acceleration signature and the second acceleration signal.

11. The system of claim 9, wherein the instructions, when executed by the one or more processors, further cause the one or more processors to:
analyze the one or more axial components of the second acceleration signal to determine an adjustment instruction corresponding to the antenna; and
wherein the alert signal includes the adjustment instruction.

12. The system of claim 9, wherein the receiver receives a distorted RFID tag signal, and the instructions, when executed by the one or more processors, further cause the one or more processors to:
attempt to interpret the distorted RFID tag signal; and
responsive to being unable to interpret the distorted RFID tag signal, determine the signal difference between the acceleration signature and the second acceleration signal.

13. The system of claim 9, wherein a housing of the receiver is mounted in a fixed position via unmovable hardware, at least one of the processor or the tilt sensor generates the alert signal indicating the movement, the tilt sensor included in the antenna includes an accelerometer, the second acceleration signal includes a timestamp, and the alert signal includes the timestamp.

14. The system of claim 9, wherein the instructions, when executed by the one or more processors, further cause the one or more processors to generate the alert signal by at least one of (i) adjusting the acceleration signature to correspond to the second acceleration signal or (ii) compensating, via the antenna, a power level associated with subsequent generated acceleration signals.

15. A tangible machine-readable medium comprising instructions for determining movement associated with an antenna of a receiver that, when executed, cause a machine to at least:
generate a first acceleration signal associated with the antenna, wherein the first acceleration signal includes one or more axial components, and at least one of the one or more axial components is substantially non-zero;
establish an acceleration signature corresponding to the antenna based on the first acceleration signal;
generate a second acceleration signal associated with the antenna, wherein the second acceleration signal includes one or more axial components, and at least one of the one or more axial components are substantially non-zero;

determine a signal difference between the acceleration signature and the second acceleration signal, wherein the signal difference is attributable to a movement of the antenna; and generate an alert signal indicating the movement, wherein the receiver is one of a plurality of receivers, each receiver includes a respective antenna, each receiver receives an RFID tag signal corresponding to an object, and the instructions, when executed, further cause the machine to at least:

determine a location associated with the object based on the RFID tag signal; and establish the acceleration signature corresponding to the antenna based on the first acceleration signal and the location associated with the object.

16. The tangible machine-readable medium of claim 15, wherein the acceleration signature includes one or more threshold axial components, and the instructions, when executed, further cause the machine to at least:

compare each axial component of the second acceleration signal to a corresponding threshold axial component of the acceleration signature; and responsive to determining at least one axial component of the second acceleration signal exceeds the corresponding threshold axial component of the acceleration signature, determine the movement associated with the antenna.

17. The tangible machine-readable medium of claim 15, wherein the instructions, when executed, further cause the machine to at least:

analyze the one or more axial components of the second acceleration signal to determine an adjustment instruction corresponding to the antenna;

at least one of (i) adjust the acceleration signature to correspond to the second acceleration signal or (ii) compensate, via the antenna, a power level associated with subsequent generated acceleration signals; and wherein the alert signal includes the adjustment instruction.

* * * * *